(12) United States Patent
Dietzsch et al.

(10) Patent No.: US 12,454,486 B2
(45) Date of Patent: Oct. 28, 2025

(54) PROCESS FOR PRODUCING CALCIUM SILICATE HYDRATE

(71) Applicant: BASF SE, Ludwigshafen am Rhein (DE)

(72) Inventors: Michael Dietzsch, Ludwigshafen am Rhein (DE); Christoph Hesse, Trostberg (DE)

(73) Assignee: BASF SE, Ludwigshafen am Rhein (DE)

( * ) Notice: Subject to any disclaimer, the term of this patent is extended or adjusted under 35 U.S.C. 154(b) by 364 days.

(21) Appl. No.: 18/030,511

(22) PCT Filed: Oct. 5, 2021

(86) PCT No.: PCT/EP2021/077358
§ 371 (c)(1),
(2) Date: Apr. 6, 2023

(87) PCT Pub. No.: WO2022/073961
PCT Pub. Date: Apr. 14, 2022

(65) Prior Publication Data
US 2023/0365468 A1     Nov. 16, 2023

(30) Foreign Application Priority Data
Oct. 9, 2020  (EP) .................................. 20200987

(51) Int. Cl.
C04B 28/18   (2006.01)
C04B 24/32   (2006.01)
C04B 40/00   (2006.01)
C04B 103/40  (2006.01)

(52) U.S. Cl.
CPC ............ *C04B 28/186* (2013.01); *C04B 24/32* (2013.01); *C04B 40/005* (2013.01); *C04B 2103/408* (2013.01)

(58) Field of Classification Search
CPC ..... C04B 28/186; C04B 24/32; C04B 40/005; C04B 2103/408; C04B 2111/00146; C04B 40/0039; C04B 40/0057; C04B 2103/10; C04B 28/18; Y02P 40/60
See application file for complete search history.

(56) References Cited

U.S. PATENT DOCUMENTS

| | | | | |
|---|---|---|---|---|
| 10,144,673 | B2 * | 12/2018 | Bichler | C04B 24/246 |
| 2012/0270970 | A1 * | 10/2012 | Bichler | C04B 28/14 |
| | | | | 524/456 |

FOREIGN PATENT DOCUMENTS

| | | | |
|---|---|---|---|
| CN | 110981259 A | 4/2020 | |
| EP | 0753488 A2 | 1/1997 | |
| EP | 0894811 A1 | 2/1999 | |
| EP | 1851256 A1 | 11/2007 | |
| EP | 2243754 A1 | 10/2010 | |
| EP | 2463314 A1 | 6/2012 | |
| EP | 2801557 A1 | 11/2014 | |
| EP | 2801558 A1 | 11/2014 | |
| EP | 2801559 A1 | 11/2014 | |
| WO | 95/04007 A1 | 2/1995 | |
| WO | 2006/042709 A1 | 4/2006 | |
| WO | 2010/026155 A1 | 3/2010 | |
| WO | 2013/017391 A1 | 2/2013 | |
| WO | WO-2014114782 A1 * | 7/2014 | ............ C04B 28/02 |
| WO | 2017/032719 A1 | 3/2017 | |
| WO | 2018/154012 A1 | 8/2018 | |
| WO | 2019/058313 A1 | 3/2019 | |

OTHER PUBLICATIONS

European Search Report for EP Patent Application No. 20200987.4, Issued on Mar. 16, 2021, 4 pages.
Hartmann, A., et al., "Hydrothermal synthesis of CSH-phases (tobermorite) under influence of Ca-formate", Meterials Reserch Bulletin, vol. 51, 2013, pp. 389-396.
International Preliminary Report on Patentability received for PCT Patent Application No. PCT/EP2021/077358, mailed on Apr. 20, 2023, 9 pages.
Land, et al., "Controlling cement hydration with nanoparticles", Cement and Concrete Composites, vol. 57, Mar. 2015, pp. 64-67.
Nicoleau, L., et al., "Oriented aggregation of calcium silicate hydrate platelets by the use of comb-like copolymers", Soft Matter, vol. 9, 2013, pp. 4864-4874.
International Search Report and Written Opinion received for PCT Patent Application No. PCT/EP2021/077358, mailed on Jan. 18, 2022, 10 pages.

\* cited by examiner

*Primary Examiner* — Anthony J Green
(74) *Attorney, Agent, or Firm* — Faegre Drinker Biddle & Reath LLP

(57) ABSTRACT

The present invention relates to a process for producing calcium silicate hydrate under hydrothermal conditions, wherein an organic compound is added in at least one of the process steps and wherein the organic compound has a molecular weight of 100 to 600 g/mol and from 0.02 to 0.035 functional groups per gram of the organic compound, wherein the functional groups being selected from —OH, —COOH, —COOM$_a$, —SO$_3$H or —SO$_3$M$_a$, or —C(=O)H, wherein M is hydrogen, a mono-, di- or trivalent metal cation, ammonium ion or an organic amine radical and a is ⅓, ½ or 1. Further the invention is directed to the calcium silicate hydrate produceable according to the process of the present invention and its use as curing accelerator for hydraulic binders.

13 Claims, No Drawings

PROCESS FOR PRODUCING CALCIUM SILICATE HYDRATE

CROSS-REFERENCE TO RELATED APPLICATIONS

This application is a National stage application (under 35 U.S.C. § 371) of PCT/EP2021/077358, filed Oct. 5, 2021, which claims benefit of European Application No. 20200987.4, filed Oct. 9, 2020, both of which are incorporated herein by reference in their entirety.

The present invention relates to a process for producing calcium silicate hydrate, the calcium silicate hydrate produceable according to the process of the present invention and its use as curing accelerator for hydraulic binders.

In cement hydration, the various cement clinker phases react with water to form mainly the hydrate phases calcium silicate hydrate, ettringite, calcium-aluminate-ferrite phases, monosulfate (kuzelite) and portlandite.

Accelerating cement hydration by addition of calcium silicate hydrate nuclei to cement is known from WO 2010/026155. The strength development of a cement can thus be accelerated by the addition of such calcium silicate hydrate nuclei. The calcium silicate hydrate nuclei are obtainable by reaction of a water-soluble calcium component with a water-soluble silicon component in aqueous solution or by reaction of a calcium compound with silicon dioxide, in each case in the presence of a water-soluble comb polymer which is suitable as plasticizer for hydraulic binders. The compositions obtained here have an excellent accelerating effect but also a relatively high viscosity which can make use difficult, for example when the composition has to be pumped or sprayed. In addition, the compositions obtained by reaction of a water-soluble calcium component with a water-soluble silicon component comprise foreign ions such as chloride and nitrate which are associated with use disadvantages, such as corrosivity.

A setting and curing accelerator for siliceous, hydraulic binders which is obtained, in particular, from the hydration of portland cements, comminuted portland clinkers or formulated portland cements or mixtures of the abovementioned starting materials by hydration at <90° C. and subsequent milling is known from WO 95/04007.

WO 2013/017391 describes a process for producing a quick-setting hydraulic binder by milling a cement clinker with from 0.1 to 5% by weight of a material comprising more than 15% by weight of calcium silicate hydrate. Water reducers, which are polyoxyalkylene polycarboxylates, can also be comilled here. The commercially available, crystalline Circolit® is used here as calcium silicate hydrate-comprising material.

G. Land and D. Stephan, Cement & Concrete Composites 57 (2015) 64-67, describe the use of tobermorite particles (630 nm) and xonotlite particles (420 nm) for accelerating cement hydration by addition of an aqueous dispersion of the particles to CEM I white cement. Here it has been found that the accelerating effect of the xonotlite particles is greater than that of the tobermorite particles.

EP 2 243 754 A1 describes a process for producing a belite-comprising binder, in which a starting material comprising calcium, silicon and oxygen atoms is admixed with water, hydrothermally treated at a temperature of from 120° C. to 250° C. and the resulting intermediate is subjected to reaction milling at a temperature of from 100° C. to 200° C. for a period of from 5 to 30 minutes. With reaction and dewatering, this forms the belite-comprising binder which can be used like portland cement.

EP 2 801 557 B9 describes a process for producing a highly reactive binder, in which a starting material is mixed from one or more raw materials comprising CaO, MgO, $SiO_2$, $Al_2O_3$ and $Fe_2O_3$ or other compounds of these elements. The mixture, which necessarily comprises Mg and Al, is hydrothermally treated at from 100 to 300° C. and a residence time of from 0.1 to 24 hours and the resulting intermediate is heat treated at from 350 to 600° C. The product obtained comprises at least one calcium silicate and at least one calcium aluminate.

EP 2 801 558 A1 describes a similar process, but the process product is used as accelerator for stiffening/setting and/or curing of portland cement.

EP 2 801 559 A1 describes a method for reinforcing the latently hydraulic and/or pozzolanic reactivity of materials such as waste products and by-products, wherein a starting material comprising a CaO source and a source of $SiO_2$ and/or $Al_2O_3$ is mixed with water and hydrothermally treated at from 100° C. to 300° C. with a residence time of from 0.1 to 50 hours. The product obtained has hydraulic, pozzolanic or latently hydraulic reactivity.

WO 2017/032719 describes a process for producing a composition which is suitable as accelerator for the curing of cement. The process comprises contacting of a hydraulic or latent hydraulic binder with a dispersant which is suitable for dispersing in organic particles in water.

The accelerators based on calcium silicate hydrate which are known from the prior art either have an unsatisfactory accelerating effect or are associated with use disadvantages (excessively high viscosity, corrosivity), so that the economically feasible use possibilities are limited.

WO 2018/154012 describes a curing accelerator composition for hydraulic binders which comprises a mineral constituent and a polymeric water-soluble dispersant. The mineral constituent comprises a semi-ordered calcium silicate hydrate having an apparent crystallite size of 15 nm or less and less than 35% by weight of crystalline phases other than the semi-ordered calcium silicate hydrate. The composition provides an excellent accelerating effect in hydraulic binders. A disadvantage of this curing accelerator is a viscosity increase of the suspension over time, which gets further accelerated with higher temperatures. After a few weeks storage at room temperature, the suspension reaches a viscosity >2000 mPas and loses its workability and transforms into a gel.

WO 2019/058313 describes an accelerating admixture for hydraulic compositions based on C—S—H seeds, which is obtainable by hydration in aqueous suspension of a hydraulic binder based on Portland cement or other hydraulic binders with a mainly silicate base, with a water/binder ratio (W/B) ranging from W/B=1 to W/B=6, at a temperature ranging from 10° C. to 90° C., for times ranging from 2 hours to 300 hours, in the presence of carboxylic acids, the calcium salts thereof, polyethanolamines, or mixtures thereof. A disadvantage of this curing accelerator is the high amount of aluminate phases which results in higher incompatibility with respect to rheology in the application when the curing agent is used in cementitious composition. Furthermore the curing agent according to WO 2019/058313 shows increased viscosity of the suspension resulting in problems during sample handling and application for example when the composition has to be pumped or sprayed.

It is therefore an object of the present invention to provide a calcium silicate hydrate-comprising composition which, in particular, has a satisfactory accelerating effect on the curing of hydraulic and latent hydraulic binders and a improved long-term storage stability as a suspension. In particular, the composition should be easy-to-handle, in particular have a viscosity which allows easy pumping and spraying of the composition even after a prolonged storage time at room temperature and elevated temperature (e.g. 40° C.), and be suitable as curing accelerator for hydraulically or latently hydraulically setting binders and thus improve the early strength of the hydraulically or latently hydraulically setting binders, in particular portland cement. Furthermore, the composition should be able to be produced economically advantageously using cheap and readily available raw materials.

The term early strength in connection with hydraulically setting binders is for the present purposes the compressive strength 6 hours after mixing of the hydraulically setting binder with water. In the case of latently hydraulically setting binders, the early strength is the compressive strength 7 days after mixing the hydraulically setting binder with water.

It has surprisingly been found that this object is achieved by a process for producing a composition comprising calcium silicate hydrate, the process comprising the steps of
a) reacting a calcium hydroxide source with a silicon dioxide source in the presence of water under hydrothermal conditions at a temperature in the range of from 100° C. to 400° C. for a period of from 1 hours to 30 hours, preferably for a period of from 5 hours to 24 hours, most preferably for a period of from 10 hours to 20 hours
b) bringing in contact
   i) the process product from step a) and
   ii) a water-soluble polymeric dispersant
   in an aqueous medium while introducing kinetic energy,
characterized in that an organic compound is added in at least one of the steps a), b) or to the process product after completion of step b),
wherein the organic compound has a molecular weight of 100 to 600 g/mol and from 0.015 to 0.035 functional groups per gram of the organic compound, wherein the functional groups being selected from —OH, —COOH, —COOM$_a$, —SO$_3$H or —SO$_3$M$_a$, or —C(=O)H, wherein M is hydrogen, a mono-, di- or trivalent metal cation, ammonium ion or an organic amine radical and a is ⅓, ½ or 1,
wherein when the organic compound is added in step a), the temperature in step a) is chosen below the melting point of the organic compound used and
wherein when the organic compound is added to the process product after completion of step b), and if the process comprises a step c) in which the process product of step b) is added to a building material mixture comprising a hydraulic binder or latent hydraulic binder, the organic compound is added between steps b) and c).

It has been found that the process provides a composition which has an excellent accelerating effect on the curing of hydraulic or latent hydraulic binders. Furthermore, the compositions of the invention remains pumpable even at high solids contents over a long period of time, in contrast to the compositions of the state of the art.

The expression "comprising" or "comprises" used here also encompasses the expressions "consisting essentially of" and "consisting of" without being synonymous with these expressions.

In a preferred embodiment the organic compound is added to the process product after completion of step b). Most preferably the organic compound is added immediately after completion of step b), preferably less than 24 h, in particular less than 1 h after completion of step b). This has the advantage that the viscosity increase of the suspension resulting from step b) is slowing down and the best long-term storage stability can be achieved.

In a preferred embodiment the organic compound is selected from the group of dextrose, galactose, tartaric acid, sodium tartrate, gluconic acid, sodium gluconate, citric acid and sodium citrate. It is further preferred that the organic compound is added in an amount of 0.5 to 6% by weight, preferably in an amount of 0.8 to 4% by weight, in particular in an amount of 1 to 2.5% by weight, based on the amount of the calcium silicate hydrate (calculated as dry component) of the produced composition.

The organic compound has a molecular weight of 100 to 600 g/mol, in particular of 150 to 400 g/mol and preferably of 180 to 220 g/mol.

The number of functional groups per gram of the organic compound are preferably 0.02 to 0.035, more preferably 0.023 to 0.0345, in particular 0.025 to 0.034 and most preferably 0.03 to 0.0335. Preferably the functional groups are selected from —OH, —COOH, —COOM$_a$ or —C(=O)H, wherein M is hydrogen, a mono-, di- or trivalent metal cation, ammonium ion or an organic amine radical and a is ⅓, ½ or 1.

In a further preferred embodiment the functional groups are selected from —OH and —C(=O)H. In an other preferred embodiment the functional groups are selected from —OH, —COOH and —COOM$_a$, wherein M is hydrogen, a mono-, di- or trivalent metal cation, ammonium ion or an organic amine radical and a is ⅓, ½ or 1. In an alternative embodiment the functional groups are selected from —OH, —SO$_3$H, —SO$_3$M$_a$, or —C(=O)H, wherein M is hydrogen, a mono-, di- or trivalent metal cation, ammonium ion or an organic amine radical and a is ⅓, ½ or 1.

The expression "functional groups per gram of the organic compound" shall be further explained by the following, non-restrictive, examples.

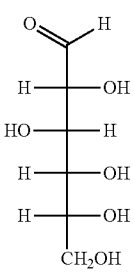

Formula 1

Formula 1 shows the formula of dextrose with a molecular weight of 180,156 g/mol. Dextrose has five OH groups and one C(=O)H group and in total 6 functional groups in the sense of the present invention.

Dextrose has therefore (6:180,156=) 0.0333 functional groups per gram of the organic compound.

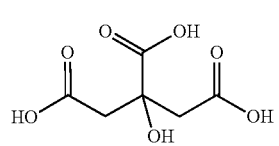

Formula 2

Formula 2 shows the formula of citric acid with a molecular weight of 192,13 g/mol. Citric acid has one OH group and three COOH groups and in total 4 functional groups in the sense of the present invention.

Citric acid has therefore (4:192,13=) 0.0208 functional groups per gram of the organic compound.

The term "hydrothermal conditions" includes the various techniques of crystallizing substances from high-temperature aqueous solutions at high vapor pressures.

Step a) is advantageously carried out in a closed vessel, for example an autoclave, at a temperature in the range from 100° C. to 400° C., in particular from 110° C. to 300° C. or from 110° C. to 230° C. or from 130° C. to 200° C. or from 130° C. to 180° C. or from 155° C. to 180° C. or from 160° C. to 180° C., and a pressure resulting therefrom. As calcium hydroxide source, in particular calcium oxide or calcium hydroxide, it is possible to use, for example, quicklime, slacked lime, etc. Examples of suitable types of silicon dioxide source, in particular silicon dioxide are silica sand or quartz flour, microsilica, etc. Furthermore, pozzolanic binders such as flyashes, slags such as blast furnace slag, and/or metakaolins can also be used as silicon dioxide source. In order to assist the reaction and shorten the reaction time, the starting materials are generally used with an average particle size of <1 mm. The silicon dioxide source generally has a particle size d(99) in the range from 1 μm to 100 μm, in particular from 1 μm to 90 μm. The amount of calcium hydroxide source and the silicon dioxide source is generally selected so that the molar ratio of Ca/Si in the process product in step a) is in the range from 0.5 to 2.5, preferably from 0.8 to 2.2, particularly preferably from 1.0 to 2.0.

It has been found to be advantageous to use a foaming agent in step a), in particular aluminum powder or a paste comprising metallic aluminum, in the hydrothermal production of the mineral constituent.

It has been found to be advantageous to comminute the process product from step a) after the hydrothermal synthesis. Conventional apparatuses such as crushers and ball mills are suitable for this purpose. Comminution is carried out until a particle size (d(97)) of 5 mm, preferably ≤2 mm and in particular a particle size (d(97)) in the range from 0.05 mm to 5 mm, preferably from 0.1 mm to 2 mm, in particular from 0.3 mm to 1 mm, is attained. Comminution is carried out at a temperature of 80° C., in particular 60° C., preferably ≤50° C.

The process product from step a) obtained after the hydrothermal synthesis is preferably firstly subjected to mechanical comminution at a temperature of 80° C., in particular ≤60° C., preferably ≤50° C.

After mechanical comminution, the process product from step a) has a particle size (d(97)) of ≤5 mm, preferably ≤2 mm and in particular ≤1 mm. For example, the particle size (d(97)) of the process product from step a) after mechanical comminution is in the range from 0.05 mm to 5 mm, preferably from 0.1 mm to 2 mm, in particular from 0.3 mm to 1 mm.

The process product from step a) which is brought into contact with the water-soluble polymeric dispersant preferably has a specific BET surface area in the range from 30 to 150 m$^2$/g, preferably from 80 to 150, in particular from 90 to 150 m$^2$/g, particularly preferably from 100 to 150 m$^2$/g, determined in accordance with DIN ISO 9277:2003-05.

The process in step a) of the invention preferably comprises at least 95% by weight, more preferably at least 98% by weight, based on the dry weight of the process product from step a), of calcium oxide (CaO) and silicon oxide (SiO$_2$). The molar ratio of Ca/Si in the process product from step a) is preferably in the range from 0.5 to 2.5, more preferably from 0.8 to 2.2, particularly preferably from 1.0 to 2.0 or from 1.6 to 2.0.

Owing to production-related impurities, the process product from step a) can comprise small amounts of aluminum ions, with the molar ratio of silicon/aluminum in the process product from step a) being from 10 000:1 to 2:1, preferably from 1000:1 to 5:1 and particularly preferably from 100:1 to 10:1.

The process product from step a) is essentially free of cement, cement clinker and/or ettringite. Here, "essentially free" means less than 10% by weight or less than 5% by weight, preferably less than 1% by weight and in particular 0% by weight, in each case based on the total dry weight of the process product from step a).

Preference is given to no foreign ions such as alkali metal ions, chloride ions or nitrate ions or only a very small amount of foreign ions being introduced into the composition according to the invention via the mineral constituent. In one embodiment, the composition of the invention comprises 2% by weight or less of alkali metals, based on the dry weight of the process product from step a).

The process product from step a) is obtained by a hydrothermal process with adherence to particular conditions, i.e. by reaction of a calcium hydroxide source, e.g. calcium oxide or calcium hydroxide, with a silicon dioxide source, e.g. silicon dioxide, in the presence of water and at an elevated temperature from 100° C. to 400° C. and elevated pressure, advantageously in an autoclave. Here, the process product from step a) is obtained as solid with physically adsorbed water. The process product from step a) produced in this way comprises preferably semi-ordered calcium silicate hydrate, crystalline foreign phases including the unreacted crystalline foreign phases or the crystalline foreign phases formed in the reaction, e.g. quartz, portlandite, calcite, etc., and also X-ray-amorphous phases.

For the purposes of the present invention, "semi-ordered" means that the calcium silicate hydrate has (1) a lower degree of order than a macroscopic crystalline calcium silicate hydrate and (2) a higher degree of order than amorphous calcium silicate hydrate. Semi-ordered calcium silicate hydrate has physical properties which differ both from the pure crystalline form and from the pure amorphous form.

One suitable method for determining whether a calcium silicate hydrate is present in semi-ordered form employs X-ray diffraction. Diffraction patterns of the calcium silicate hydrate can be recorded using a commercial powder diffractometer. The X-ray diffraction pattern of the semi-ordered calcium silicate hydrate differs from the X-ray diffraction pattern of a crystalline calcium silicate hydrate. Semi-ordered calcium silicate hydrate displays a diffraction pattern in which the reflections or diffraction lines or "peaks" are broader or less well-defined and/or partly absent compared to the diffraction pattern of the crystalline form. In the following, a "peak" is a maximum in the plot of the X-ray diffraction intensity against the diffraction angle. The main diffraction peak of the semi-ordered calcium silicate hydrate has, for example, a width at half height which is at least 1.25 times, usually at least 2 times or at least 3 times, the width at half height of the corresponding main diffraction peak of the crystalline form having a crystallite size of 50 nm or more.

Furthermore, the X-ray diffraction pattern of the semi-ordered calcium silicate hydrate also differs from the purely X-ray-amorphous form. The X-ray diffraction pattern of the semi-ordered calcium silicate hydrate displays few broad phase-specific X-ray diffraction maxima which indicate a certain degree of order of the calcium silicate hydrate, while the X-ray-amorphous form displays no distinguishable X-ray diffraction maxima. No calcium silicate hydrate phase can be assigned unambiguously to the X-ray-amorphous form.

Semi-ordered calcium silicate hydrate has a long-range order of less than 100 repeating units, usually less than 20 repeating units, of the unit cell in at least one direction in space. If the coherently scattering regions (crystallites), which correspond to the repeating units of the unit cell, are very small in a sample, the individual crystallites which are actually present in the reflection plane are often slightly tilted relative to one another. In addition, the disruption of the structure at the grain boundaries results in changes in the diffraction behavior. The angle range in which reflection and thus a diffraction signal still occurs is broadened thereby. An "apparent" crystallite size can be calculated by the method of Scherrer from the widths at half height of X-ray diffraction signals:

$$\beta = \lambda/\varepsilon \cos \theta$$

$\beta$=width at half height
$\lambda$=wavelength
$\varepsilon$=apparent crystallite size
$\theta$=Bragg angle In practice, the "whole pattern fitting structure refinement (PFSR)" of Hugo Rietveld ("Rietveld analysis") has been found to be useful for evaluating the diffraction pattern. This software method serves to refine a number of measurement parameters, including lattice parameters, signal width and signal shape. Theoretical diffraction patterns can be calculated in this way. As soon as the calculated diffraction pattern is virtually identical to the data of an unknown sample, precise quantitative information as to crystallite size and amorphous content can be determined.

According to the invention, the semi-ordered calcium silicate hydrate has preferably an apparent crystallite size of 15 nm or less, in particular 10 nm or less, preferably 5 nm or less, determined by means of X-ray diffraction analysis and subsequent Rietveld analysis. The apparent crystallite size is preferably at least 1 nm, e.g. from 1 to 15 nm, or from 1 to 10 nm and particularly preferably from 1 nm to 5 nm.

The unit cells of the ordered regions of the semi-ordered calcium silicate hydrate, the size of which is described with the aid of their apparent crystallite size in the present patent application, are derived from crystalline calcium silicate hydrate phases (C—S—H). Crystalline calcium silicate hydrate phases are, in particular, foshagite, hillebrandite, xonotlite (belovite), xonotlite (kudohite), nekoite, clinotobermorite, 9 Å-tobermorite (riversiderite), 10 Å-tobermorite, 11 Å-tobermorite (C/S 0.75 and 0.66), 14 Å-tobermorite (plombierite), jennite, metajennite, calcium chondrodite, afwillite, $\alpha$-$C_2SH$, dellaite, jaffeite, rosenhahnite, killalaite, bultfonteinite, reinhardbraunsite, kilchoanite, $C_8S_5$, okenite, reyerite, gyrolith, truscottite, K-phase, Z-phase, scawtite, fukalite, tylleite, spurrite and/or suolunite, preferably as xonotlite, 9 Å-tobermorite (riversiderite), 11 Å-tobermorite, 14 Å-tobermorite (plombierite), jennite, metajennite, afwillite and/or jaffeite.

The unit cells of the ordered regions are preferably derived from 9 Å-tobermorite (riversiderite), 10 Å-tobermorite, 11 Å-tobermorite (C/S 0.75 and 0.66), 14 Å-tobermorite (plombierite), scawtite and/or xonotlite or mixtures.

For the present purposes, it has been found to be a sufficient approximation for the determination of the apparent crystallite size to be based exclusively on the unit cell of 14 Å-tobermorite (plombierite).

In an prefered embodiment the process product from step a) comprises a semi-ordered calcium silicate hydrate having an apparent crystallite size of 15 nm or less. The process product from step a) further preferably comprises less than 35% by weight, based on the dry weight of the mineral constituent, of crystalline phases other than the semi-ordered calcium silicate hydrate, i.e. crystalline phases which are not calcium silicate hydrate phase (C—S—H) (hereinafter also: "crystalline foreign phases"). Crystalline foreign phases are portlandite ($Ca(OH)_2$), calcite ($CaCO_3$), aragonite ($CaCO_3$), vaterite ($CaCO_3$) and $\alpha$-quartz ($SiO_2$). The content of crystalline foreign phases can be in the range from 0.1 to less than 35% by weight, preferably from 1 to 25% by weight, based on the dry weight of the process product from step a). The dry weight is determined by drying the process product from step a) to constant weight at 105° C.

In the case of contamination with aluminum, the process product from step a) can also comprise aluminum-comprising phases such as gibbsite ($Al(OH)_3$).

The process product from step a) typically also comprises an X-ray-amorphous phase in addition to the semi-ordered calcium silicate hydrate (and possibly crystalline foreign phases). In one embodiment, the process product from step a) comprises at least ≥10% by weight, preferably ≥40% by weight, particularly preferably ≥60% by weight and in particular from 10 to 99.9% by weight or from 10 to 80% by weight, preferably from 40 to 80% by weight, of X-ray-amorphous phase, based on the dry weight of the process product from step a), determined by means of X-ray diffraction analysis and subsequent Rietveld analysis.

The sum of semi-ordered calcium silicate hydrate and X-ray-amorphous phase is preferably at least 65% by weight, e.g. from 65 to 99% by weight, based on the dry weight of the process product from step a), determined by means of X-ray diffraction analysis and subsequent Rietveld analysis.

For the present purposes, a "water-soluble polymeric dispersant" is an organic water-soluble polymeric dispersant, i.e. it is an organic polymer which at 20° C. and atmospheric pressure has a solubility in water of at least 1 gram per liter, in particular at least 10 gram per liter and particularly preferably at least 100 gram per liter.

The dispersant is, in particular, a comb polymer having polyether side chains, preferably polyalkylene oxide side chains.

The polymeric dispersant is preferably a copolymer which has acid functions and polyether side chains on the main chain.

In one embodiment, the polymeric dispersant has at least one structural unit of the general formulae (Ia), (Ib), (Ic) and/or (Id), where the structural units (Ia), (Ib), (Ic) and (Id) are able to be identical or different within a single polymer molecule and also between various polymer molecules:

where
- $R^1$ is H or an unbranched or branched $C_1$-$C_4$-alkyl group, $CH_2COOH$ or $CH_2CO$—X—$R^2$, preferably H or $CH_3$;
- X is NH—$(C_nH_{2n})$, $O(C_nH_{2n})$ where n=1, 2, 3 or 4, where the nitrogen atom or the oxygen atom is bound to the CO group, or is a chemical bond, preferably X=chemical bond or $O(C_nH_{2n})$;
- $R^2$ is OM, $PO_3M_2$, O—$PO_3M_2$ or $SO_3M$; with the proviso that X is a chemical bond when $R^2$ is OM;

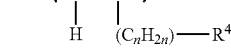

where
- $R^3$ is H or an unbranched or branched $C_1$-$C_4$-alkyl group, preferably H or $CH_3$;
- n is 0, 1, 2, 3 or 4, preferably 0 or 1;
- $R_4$ is $PO_3M_2$, O-$PO_3M_2$ or $SO_3M$;

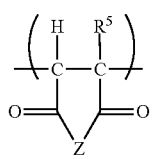

where
- $R^5$ is H or an unbranched or branched $C_1$-$C_4$-alkyl group, preferably H;
- Z is O or $NR^7$, preferably O;
- $R^7$ is H, $(C_nH_{2n})$—OH, $(C_nH_{2n})$—$PO_3M_2$, $(C_nH_2n)$—$OPO_3M_2$, $(C_6H_4)$—$PO_3M_2$, $(C_6H_4)$—$OPO_3M_2$, $C_nH_{2n})$—$SO_3M$ or $(C_6H_4)$—$SO_3M$, and
- n is 1, 2, 3 or 4, preferably 1, 2 or 3;

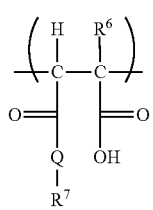

where
- $R_6$ is H or an unbranched or branched $C_1$-$C_4$-alkyl group, preferably H;
- Q is $NR^7$ or O, preferably O;
- $R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, $(C_6H_4)$—$OPO_3M_2$, $(C_nH_{2n})$—$SO_3M$ or $(C_6H_4)$—$SO_3M$,
- n is 1, 2, 3 or 4, preferably 1, 2 or 3; and each M in the above formulae is independently H or one cation equivalent.

The comb polymer preferably has at least one structural unit of the formula (Ia) in which $R^1$ is H or $CH_3$; and/or at least one structural unit of the formula (Ib) in which $R_3$ is H or $CH_3$; and/or at least one structural unit of the formula (Ic) in which $R^5$ is H or $CH_3$ and Z is O; and/or at least one structural unit of the formula (Id) in which $R^6$ is H and Q is O.

The comb polymer preferably has at least one structural unit of the formula (Ia) in which $R^1$ is H or $CH_3$ and $XR^2$ is OM or X is O $(C_nH_{2n})$ where n=1, 2, 3 or 4, in particular 2, and $R^2$ is O—$PO_3M_2$.

The comb polymer preferably has, as polyether side chain, at least one structural unit of the general formulae (IIa), (IIb), (IIc) and/or (IId):

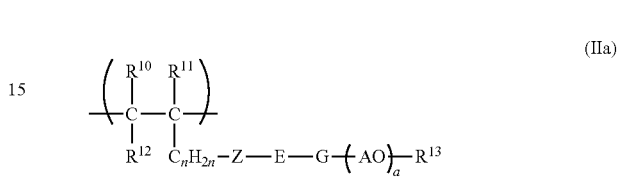

where
- $R^{10}$, $R^{11}$ and $R^{12}$ are each, independently of one another, H or an unbranched or branched $C_1$-$C_4$-alkyl group;
- Z is O or S;
- E is an unbranched or branched $C_1$-$C_6$-alkylene group, a cyclohexylene group, $CH_2$-$C_6H_{10}$, 1,2-phenylene, 1,3-phenylene or 1,4-phenylene;
- G is O, NH or CO—NH; or
- E and G are together a chemical bond;
- A is $C_xH_{2x}$ where x=2, 3, 4 or 5 or $CH_2CH(C_6H_5)$, preferably 2 or 3;
- n is 0, 1, 2, 3, 4 or 5, preferably 0, 1 or 2;
- a is an integer from 2 to 350, preferably from 5 to 150;
- $R^{13}$ is H, an unbranched or branched $C_1$-$C_4$-alkyl group, CO—$NH_2$ and/or $COCH_3$;

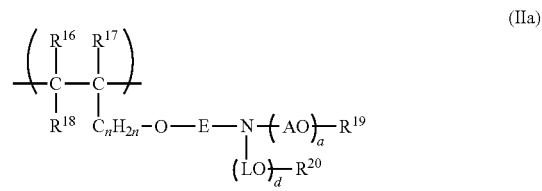

where
- $R^{16}$, $R^{17}$ and $R^{18}$ are each, independently of one another, H or an unbranched or branched $C_1$-$C_4$-alkyl group;
- E is an unbranched or branched $C_1$-$C_6$-alkylene group, a cyclohexylene group, $CH_2$-$C_6H_{10}$, 1,2-phenylene, 1,3-phenylene or 1,4-phenylene or a chemical bond;
- A is $C_xH_{2x}$ where x=2, 3, 4 or 5 or $CH_2CH(C_6H_5)$, preferably 2 or 3;
- n is 0, 1, 2, 3, 4 and/or 5, preferably 0, 1 or 2;
- L is $C_xH_{2x}$ where x=2, 3, 4 or 5 or $CH_2$—$CH(C_6H_5)$, preferably 2 or 3;
- a is an integer from 2 to 350, preferably from 5 to 150;
- d is an integer from 1 to 350, preferably from 5 to 150;
- $R^{19}$ is H or an unbranched or branched $C_1$-$C_4$-alkyl group;
- $R^{20}$ is H or an unbranched $C_1$-$C_4$-alkyl group;

$$\left( \begin{array}{cc} R^{21} & R^{22} \\ | & | \\ C-C \\ | & | \\ R^{23} & C-W-[(AO)_a-R^{24}]_Y \\ & \| \\ & O \end{array} \right) \quad \text{(IIc)}$$

where $R^{21}$, $R^{22}$ and $R^{23}$ are each, independently of one another, H or an unbranched or branched $C_1$-$C_4$-alkyl group;

W is O, $NR^{25}$ or N;

Y is 1 when W=O or $NR^{25}$ and is 2 when W=N;

A is $C_xH_{2x}$ where x=2, 3, 4 or 5 or $CH_2CH(C_6H_5)$, preferably 2 or 3;

a is an integer from 2 to 350, preferably from 5 to 150;

$R^{24}$ is H or an unbranched or branched $C_1$-$C_4$-alkyl group; and $R^{25}$ is H or an unbranched or branched $C_1$-$C_4$-alkyl group;

$$\left( \begin{array}{cc} R^6 & H \\ | & | \\ C-C \\ | & | \\ MO-C & C-Q-[(AO)_a-R^{24}]_Y \\ \| & \| \\ O & O \end{array} \right) \quad \text{(IId)}$$

where $R^6$ is H or an unbranched or branched $C_1$-$C_4$-alkyl group;

Q is $NR^{10}$, N or O;

V is 1 when W=O or $NR^{10}$ and is 2 when W=N;

$R^{10}$ is H or an unbranched or branched $C_1$-$C_4$-alkyl group; and

A is $C_xH_{2x}$ where x=2, 3, 4 or 5, or $CH_2C(C_6H_5)H$, preferably 2 or 3;

$R^{24}$ is H or an unbranched or branched $C_1$-$C_4$-alkyl group;

M is H or one cation equivalent; and a is an integer from 2 to 350, preferably from 5 to 150.

Particular preference is given to the structural unit of the formula Ia being a methacrylic acid unit or acrylic acid unit, the structural unit of the formula Ic being a maleic anhydride unit and the structural unit of the formula Id being a maleic acid unit or a maleic monoester unit.

If the monomers (I) are phosphoric esters or phosphonic esters, they can also comprise the corresponding diesters and triesters and also the monoesters of diphosphoric acid. These are generally formed in addition to the monoester in various proportions, for example 5-30 mol % of diester and 1-15 mol % of triester together with 2-20 mol % of the monoester of diphosphoric acid in the esterification of organic alcohols with phosphoric acid, polyphosphoric acid, phosphorus oxides, phosphorus halides or phosphorus oxyhalides or the corresponding phosphonic acid compounds.

The comb polymer preferably has, as polyether side chain:

(a) at least one structural unit of the formula (IIa) in which $R^{10}$ and $R^{12}$ are each H, $R^{11}$ is H or $CH_3$, E and G together are a chemical bond, A is $C_xH_{2x}$ where x=2 and/or 3, a is from 3 to 150 and $R^{13}$ is H or an unbranched or branched $C_1$-$C_4$-alkyl group; and/or (b) at least one structural unit of the formula (IIb) in which $R^{16}$ and $R^{18}$ are each H, $R^{17}$ is H or $CH_3$, E is an unbranched or branched $C_1$-$C_6$-alkylene group, A is $C_xH_{2x}$ where x=2 and/or 3, L is $C_xH_{2x}$ where x=2 and/or 3, a is an integer from 2 to 150, d is an integer from 1 to 150, $R^{19}$ is H or an unbranched or branched $C_1$-$C_4$-alkyl group and $R^{20}$ is H or an unbranched or branched $C_1$-$C_4$-alkyl group; and/or (c) at least one structural unit of the formula (IIc) in which $R^{21}$ and $R^{23}$ are each H, $R^{22}$ is H or $CH_3$, A is $C_xH_{2x}$ where x=2 and/or 3, a is an integer from 2 to 150 and $R^{24}$ is H or an unbranched or branched $C_1$-$C_4$-alkyl group; and/or (d) at least one structural unit of the formula (IId) in which $R^6$ is H, Q is O, $R^7$ is $(C_nH_{2n})$—O-$(AO)_a$—$R^9$, n is 2 and/or 3, A is $C_xH_{2x}$ where x=2 and/or 3, a is an integer from 1 to 150 and $R^9$ is H or an unbranched or branched $C_1$-$C_4$-alkyl group.

The structural unit of the formula IIa is particularly preferably an alkoxylated isoprenyl, alkoxylated hydroxybutyl vinyl ether, alkoxylated (meth)allyl alcohol or a vinylated methylpolyalkylene glycol unit, in each case preferably having an arithmetic mean of from 2 to 350 oxyalkylene groups.

The comb polymer preferably comprises at least one structural unit of the formula (IIa) and/or (IIc), in particular of the formula (IIa).

Apart from the structural units of the formulae (I) and (II), the polymeric dispersant can also comprise further structural units which are derived from free-radically polymerizable monomers, e.g. hydroxyethyl (meth)acrylate, hydroxypropyl (meth)acrylate, (meth)acrylamide, ($C_1$-$C_4$)-alkyl (meth) acrylates, styrene, styrenesulfonic acid, 2-acrylamido-2-methylpropanesulfonic acid, (meth)allylsulfonic acid, vinylsulfonic acid, vinyl acetate, acrolein, N-vinylformamide, vinylpyrrolidone, (meth)allyl alcohol, isoprenol, 1-butylvinyl ether, isobutyl vinyl ether, aminopropyl vinyl ether, ethylene glycol monovinyl ether, 4-hydroxybutyl monovinyl ether, (meth)acrolein, crotonaldehyde, dibutyl maleate, dimethyl maleate, diethyl maleate, dipropyl maleate, etc.

The preparation of the comb polymers which comprise the structural units (I) and (II) is carried out in a conventional way, for example by free-radical polymerization. It is, for example, described in EP0894811, EP1851256, EP2463314, EP0753488.

The comb polymer preferably has units of the formulae (I) and (II), in particular of the formulae (Ia) and (IIa).

The comb polymer preferably has structural units of the formulae (Ia) and (IIc).

The comb polymer preferably has structural units of the formulae (Ic) and (IIa).

The comb polymer preferably has structural units of the formulae (Ia), (Ic) and (IIa).

The comb polymer is preferably made up of (i) anionic or anionogenic structural units which are derived from acrylic acid, methacrylic acid, maleic acid, hydroxyethylacrylate phosphate, and/or hydroxyethyl methacrylate phosphate, hydroxyethyl acrylate diester of phosphoric acid and/or hydroxyethyl methacrylate diester of phosphoric acid and (ii) structural units having polyether side chains, where the structural units are derived from $C_1$-$C_4$-alkylpolyethylene glycol acrylate, polyethylene glycol acrylate, $C_1$-$C_4$-alkylpolyethylene glycol methacrylate, polyethylene glycol methacrylate, $C_1$-$C_4$-alkylpolyethylene glycol acrylate, polyethylene glycol acrylate, vinyloxy-$C_2$-$C_4$-alkylenepolyethylene glycol, vinyloxy-$C_2$-$C_4$-alkylenepolyethylene glycol $C_1$-$C_4$-alkyl ether, allyloxypolyethylene glycol, allyloxypolyethylene glycol $C_1$-$C_4$-alkyl ether, methallyloxypolyethylene glycol, methallyloxypolyethylene glycol $C_1$-$C_4$-alkyl ether, isoprenyloxypolyethylene glycol and/or isoprenyloxypolyethylene glycol $C_1$-$C_4$-alkyl ether.

The comb polymer is preferably made up of structural units (i) and (ii) which are derived from
- (i) hydroxyethyl acrylate phosphate and/or hydroxyethyl methacrylate phosphate and (ii) $C_1$-$C_4$-alkylpolyethylene glycol acrylate and/or $C_1$-$C_4$-alkylpolyethylene glycol methacrylate; or
- (i) acrylic acid and/or methacrylic acid and (ii) $C_1$-$C_4$-alkylpolyethylene glycol acrylate and/or $C_1$-$C_4$-alkylpolyethylene glycol methacrylate; or
- (i) acrylic acid, methacrylic acid and/or maleic acid and (ii) vinyloxy-$C_2$-$C_4$-alkylenepolyethylene glycol, allyloxypolyethylene glycol, methallyloxypolyethylene glycol and/or isoprenyloxypolyethylene glycol.

The comb polymer is preferably made up of structural units (i) and (ii) which are derived from
- (i) hydroxyethyl methacrylate phosphate and (ii) $C_1$-$C_4$-alkylpolyethylene glycol methacrylate or polyethylene glycol methacrylate; or
- (i) methacrylic acid and (ii) $C_1$-$C_4$-alkylpolyethylene glycol methacrylate or polyethylene glycol methacrylate; or
- (i) acrylic acid and maleic acid and (ii) vinyloxy-$C_2$-$C_4$-alkylenepolyethylene glycol or
- (i) acrylic acid and maleic acid and (ii) isoprenyloxypolyethylene glycol or
- (i) acrylic acid and (ii) vinyloxy-$C_2$-$C_4$-alkylenepolyethylene glycol or
- (i) acrylic acid and (ii) isoprenyloxypolyethylene glycol or
- (i) acrylic acid and (ii) methallyloxypolyethylene glycol or
- (i) maleic acid and (ii) isoprenyloxypolyethylene glycol or
- (i) maleic acid and (ii) allyloxypolyethylene glycol or
- (i) maleic acid and (ii) methallyloxypolyethylene glycol.

The molar ratio of the structural units (I):(II) is preferably from 1:4 to 15:1, in particular from 1:1 to 10:1.

The molecular weight of the polyether side chains is preferably >500 g/mol, more preferably >3000 g/mol, and <8000 g/mol, preferably <6000 g/mol.

The molecular weight of the polyether side chains is preferably in the range of 2000-8000 g/mol, in particular 4000-6000 g/mol.

In one embodiment, the water-soluble polymeric dispersant is a polycondensation product having polyalkylene oxide side chains.

Preferably the polycondensation product comprises structural units (III) and (IV):

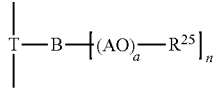
(III)

where
T is a substituted or unsubstituted phenyl radical, substituted or unsubstituted naphthyl radical or a substituted or unsubstituted heteroaromatic radical having from 5 to 10 ring atoms of which 1 or 2 atoms are heteroatoms selected from among N, O and S;
n is 1 or 2;
B is N, NH or O, with the proviso that n is 2 when B is N and with the proviso that n is 1 when B is NH or O;
A is $C_xH_{2x}$, where x=2, 3, 4 or 5 or $CH_2CH(C_6H_5)$;
a is an integer from 1 to 300, preferably from 5 to 150;
$R^{25}$ is H, a branched or unbranched $C_1$-$C_{10}$-alkyl radical, $C_5$-$C_8$-cycloalkyl radical, aryl radical or heteroaryl radical having from 5 to 10 ring atoms of which 1 or 2 atoms are heteroatoms selected from among N, O and S;
where the structural unit (IV) is selected from among the structural units (IVa) and (IVb)

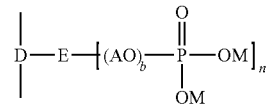
(IVa)

where
D is a substituted or unsubstituted phenyl radical, substituted or unsubstituted naphthyl radical or a substituted or unsubstituted heteroaromatic radical having from 5 to 10 ring atoms of which 1 or 2 atoms are heteroatoms selected from among N, O and S;
E is N, NH or O, with the proviso that m is 2 when E is N and with the proviso that m is 1 when E is NH or O;
A is $C_xH_{2x}$ where x=2, 3, 4 or 5 or $CH_2CH(C_6H_5)$;
b is an integer from 1 to 300, preferably from 1 to 50;
M is in each case independently H, one cation equivalent; and

(IVb)

where
V is a substituted or unsubstituted phenyl radical or substituted or unsubstituted naphthyl radical, where V is optionally substituted by 1 or two radicals selected independently from among $R^8$, OH, $OR^8$, $(CO)R^8$, COOM, $COOR^8$, $SO_3R^8$ and $NO_2$, preferably OH; $OC_1$-$C_4$-alkyl and $C_1$-$C_4$-alkyl;
$R^7$ is COOM, $OCH_2COOM$, $SO_3M$ or $OPO_3M_2$;
M is H or one cation equivalent;
where the phenyl, naphthyl or heteroaromatic radicals mentioned are optionally substituted by 1 or two radicals selected from among $R^8$, OH, $OR^8$, $(CO)R^8$, COOM, $COOR^8$, $SO_3R^8$ and $NO_2$; and
$R^8$ is $C_1$-$C_4$-alkyl, phenyl, naphthyl, phenyl-$C_1$-$C_4$-alkyl or $C_1$-$C_4$-alkylphenyl.

In the general formula (III), a is preferably an integer from 1 to 300 and in particular from 5 to 150, and in the general formula (IV), b is preferably an integer from 1 to 300, in particular from 1 to 50 and particularly preferably from 1 to 10. Furthermore, the radicals of the general formulae (III) or (IV) can, independently of one another, in each case have the same chain length, with a and b each being represented by one number. It is generally advantageous here for mixtures having different chain lengths to be present in each case, so that the radicals of the structural units in the polycondensation product have different numerical values for a and independently for b.

In the formula III, preference is given to T being a substituted or unsubstituted phenyl radical or naphthyl radical, A being $C_xH_{2x}$ where x=2 and/or 3, a being an integer from 1 to 150 and $R^{25}$ being H or a branched or unbranched $C_1$-$C_{10}$-alkyl radical.

In the formula Iva, preference is given to D being a substituted or unsubstituted phenyl radical or naphthyl radical, E being NH or O, A being $C_xH_{2x}$ where x=2 and/or 3 and b being an integer from 1 to 150.

T and/or D are preferably phenyl or naphthyl substituted by 1 or 2 $C_1$-$C_4$-alkyl groups, hydroxy groups or 2 $C_1$-$C_4$-alkoxy groups.

Preference is given to V being phenyl or naphthyl substituted by 1 or 2 $C_1$-$C_4$-alkyl, OH, $OCH_3$ or COOM groups and $R^7$ being COOM or $OCH_2COOM$.

The structural units T and D in the general formulae (III) and (IV) of the polycondensation product are preferably derived from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, phenoxyacetic acid, salicylic acid, preferably from phenyl, where T and D can be selected independently of one another and can each also be derived from a mixture of the radicals mentioned. The groups B and E are, independently of one another, preferably O. All structural units A can be identical or different both within individual polyether side chains and also between various polyether side chains. A is $C_2H_4$ in a particularly preferred embodiment.

It is advantageous to have a relatively high proportion of structural units (IV) in the polycondensation product, since a relatively high negative charge of the polymers has an advantageous effect on the stability of the aqueous colloidal preparation. The molar ratio of the structural units (IVa):(IVb), when both are present, is typically from 1:10 to 10:1 and preferably from 1:3 to 3:1.

In particular embodiments the polycondensation product comprises a further structural unit (V) of the formula

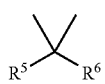

(V)

where
$R^5$ and $R^6$ can be identical or different and be H, $CH_3$, COOH or a substituted or unsubstituted phenyl or naphthyl group or be a substituted or unsubstituted heteroaromatic group having from 5 to 10 ring atoms of which 1 or 2 atoms are heteroatoms selected from among N, O and S.

$R^5$ and $R^6$ can be identical or different and each be H, $CH_3$ or COOH, in particular H or one of the radicals $R^5$ and $R^6$ can be H and the other can be $CH_3$. Typically, $R^5$ and $R^6$ in the structural unit (V) are identical or different and are each H, COOH and/or methyl. Very particular preference is given to H.

The polycondensates are typically prepared by a process in which the compounds on which the structural units (III), (IV) and (V) are based are reacted with one another. The preparation of the polycondensates is, for example, described in WO 2006/042709 and WO 2010/026155.

The monomer having a keto group is preferably an aldehyde or ketone. Examples of monomers of the formula (V) are formaldehyde, acetaldehyde, acetone, glyoxylic acid and/or benzaldehyde. Formaldehyde is preferred.

In general, the polycondensation product has a weight average molecular weight of from 5000 g/mol to 200 000 g/mol, preferably from 10 000 to 100 000 g/mol and particularly preferably from 15 000 to 55 000 g/mol.

The molar ratio of the structural units (III):(IV) is preferably from 4:1 to 1:15, in particular from 2:1 to 1:10.

The molar ratio of the structural units (III+IV):(V) is preferably from 2:1 to 1:3, in particular from 1:0.8 to 1:2.

In preferred embodiments, the comb polymer is made up of structural units of the formulae (III) and (IV) in which T and D are each phenyl or naphthyl, where the phenyl or naphthyl is optionally substituted by 1 or 2 $C_1$-$C_4$-alkyl groups, hydroxy groups or 2 $C_1$-$C_4$-alkoxy groups, B and E are O, A is $C_xH_{2x}$ where x=2, a is from 3 to 150, in particular from 10 to 150, and b is 1, 2 or 3.

In particular embodiments, a homopolymer comprising units comprising sulfo and/or sulfonate groups or units comprising carboxyl and/or carboxylate groups or a copolymer comprising units comprising sulfo and/or sulfonate groups and units comprising carboxylate and/or carboxyl groups is used as polymeric dispersant.

For example, the units comprising sulfo and/or sulfonate groups are vinylsulfonic acid, allylsulfonic acid, methallylsulfonic acid, 4-vinylphenylsulfonic acid units or structural units of the formula (VI)

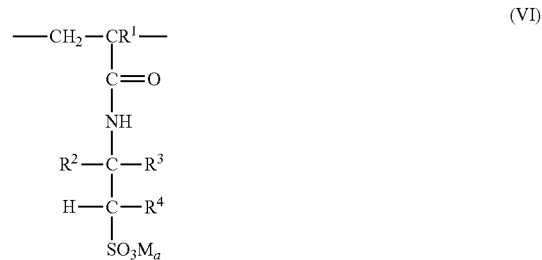

(VI)

where
$R^1$ is H or $CH_3$,
$R^2$, $R^3$ and $R^4$ are each, independently of one another, H or straight-chain or branched $C_1$-$C_6$-alkyl or $C_6$-$C_{14}$-aryl,
M is H or a cation, in particular a metal cation, preferably a monovalent or divalent metal cation, or an ammonium cation,
a is 1 or 1/valence of the cation, in particular ½ or 1.

The units comprising sulfo and/or sulfonate groups are preferably vinylsulfonic acid, methallylsulfonic acid and/or 2-acrylamido-2-methylpropylsulfonic acid units, in particular 2-acrylamido-2-methylpropylsulfonic acid units.

The units comprising carboxyl and/or carboxylate groups are preferably acrylic acid, methacrylic acid, 2-ethylacrylic acid, vinylacetic acid, crotonic acid, maleic acid, fumaric acid, itaconic acid and/or citraconic acid units and in particular acrylic acid and/or methacrylic acid units.

The molecular weight Mw of the copolymer is preferably in the range from 1000 to 50 000, determined by means of aqueous gel permeation chromatography.

In particularly useful embodiments, the dispersant is selected from among:
copolymers comprising structural units of the formulae (Ia) and (IIa), in particular copolymers comprising structural units derived from acrylic acid and/or methacrylic acid and ethoxylated hydroxyalkyl vinyl ethers, e.g. ethoxylated hydroxybutyl vinyl ether;

copolymers comprising structural units of the formulae (Ia), (Id) and (IIa), in particular copolymers comprising structural units derived from acrylic acid and/or methacrylic acid, maleic acid and ethoxylated hydroxyalkyl vinyl ethers, e.g. ethoxylated hydroxybutyl vinyl ether;

copolymers comprising structural units of the formulae (Ia) and (IIc), in particular copolymers comprising structural units derived from acrylic acid and/or methacrylic acid and esters of acrylic acid or methacrylic acid with polyethylene glycol or polyethylene glycol which is end-capped by $C_1$-$C_{12}$-alkyl;

polycondensation products comprising structural units (III), (IVa) and (V), in particular condensation products of ethoxylated phenol, phenoxy-$C_2$-$C_6$-alkanol phosphate and formaldehyde;

homopolymers comprising units comprising sulfo and/or sulfonate groups or units comprising carboxyl and/or carboxylate groups;

copolymers comprising units comprising sulfo and/or sulfonate groups and units comprising carboxyl and/or carboxylate groups; and/or polyacrylic acid;

and the salts thereof and combinations of two or more of these dispersants.

In one embodiment, at least one further dispersant selected from among lignosulfonates, melamine-formaldehyde sulfonate condensates, ß-naphthalenesulfonic acid condensates, phenolsulfonic acid condensates and sulfonated ketone-formaldehyde condensates is additionally used.

The molar ratio of the structural units (III):(IV) is typically from 4:1 to 1:15 and preferably from 2:1 to 1:10.

In a preferred embodiment, the polycondensation product comprises a further structural unit (V) which is represented by the following formula:

(V)

where
$R^5$ is H, $CH_3$, COOH or substituted or unsubstituted phenyl or substituted or unsubstituted naphthyl;
$R^6$ is H, $CH_3$, COOH or substituted or unsubstituted phenyl or substituted or unsubstituted naphthyl.

The comb polymer can also be present in the form of its salts, for example the sodium, potassium, organic ammonium, ammonium and/or calcium salt, preferably as sodium and/or calcium salt.

The molecular weight of the polymeric dispersant, determined by means of gel chromatography using polystyrene as standard, is generally in the range from 5000 to 100 000. The molecular weight of the side chains is generally in the range from 1000 to 10 000.

The charge density of the polymers is generally in the range from 500 µeq/g to 1500 µeq/g.

Preferred polymeric dispersants are:
copolymers comprising structural units of the formulae (Ia) and (IIa), in particular copolymers comprising structural units derived from acrylic acid and/or methacrylic acid and ethoxylated hydroxyalkyl vinyl ethers, e.g. ethoxylated hydroxybutyl vinyl ether;

copolymers comprising structural units of the formulae (Ia), (Id) and (IIa), in particular copolymers comprising structural units derived from acrylic acid and/or methacrylic acid, maleic acid and ethoxylated hydroxyalkyl vinyl ethers, e.g. ethoxylated hydroxybutyl vinyl ether;

copolymers comprising structural units of the formulae (Ia) and (IIc), in particular copolymers comprising structural units derived from acrylic acid and/or methacrylic acid and esters of acrylic acid or methacrylic acid with polyethylene glycol or polyethylene glycol which is end-capped by $C_1$-$C_{12}$-alkyl;

polycondensation products comprising structural units (III), (IVa) and (V), in particular condensation products of ethoxylated phenol, phenoxy-$C_2$-$C_6$-alkanol phosphate and formaldehyde;

homopolymers comprising units comprising sulfo and/or sulfonate groups or units comprising carboxyl and/or carboxylate groups;

copolymers comprising units comprising sulfo and/or sulfonate groups and units comprising carboxyl and/or carboxylate groups; and/or polyacrylic acid;

and the salts thereof and combinations of two or more of these dispersants.

To produce the composition comprising calcium silicate hydrate, the process product from step a) is brought into contact with at least one water-soluble polymeric dispersant in an aqueous medium.

For the contacting with the polymeric dispersant, the process product from step a) can be used in the form of a suspension or as dry powder. The polymeric dispersant is then added all at once or in two or more portions to the process product from step a), either as solid or in the form of an aqueous solution. However, the process product from step a) is preferably added all at once or in two or more portions as solid or as aqueous suspension to an aqueous solution of the polymeric dispersant.

In one embodiment, the weight ratio of the process product from step a) (calculated as dry component) to polymeric dispersant (calculated as dry component) is in the range from 15:1 to 1:2, in particular in the range from 10:1 to 1:1.5, particularly preferably in the range from 5:1 to 1:1.

In one embodiment, the weight ratio of process product from step a) (calculated as dry component) to water is in the range from 3:1 to 1:20, in particular in the range from 1:1 to 1:10, particularly preferably from 2:3 to 1:5.

The determination of the dry component of the process product from step a) is carried out by drying the material to constant weight at 105° C. in a laboratory oven and measuring the resulting loss in weight on drying.

The water content of the suspension (determined by drying the suspension to constant weight at 105° C.) in the contacting of the process product from step a) with the polymeric dispersant is appropriately in the range from 25% by weight to 95% by weight, in particular in the range from 50% by weight to 90% by weight, particularly preferably 60% by weight to 80% by weight.

If desired, the process can be carried out with addition of portland cement, portland cement clinker and/or a latent hydraulic binder, with the proportion by mass of portland cement, portland cement clinker and/or latent hydraulic binder, based on the sum of the amount of process product from step a), being from 0.01 to 10% by weight, preferably from 0.01 to 5% by weight. The addition can be carried out before contacting with the polymeric dispersant, or after mechanical comminution of the mineral constituent.

In preferred embodiments, the process is carried out essentially without addition of other constituents and in particular essentially without addition of portland cement, portland cement clinker and/or ettringite.

The contacting of the process product from step a) with the polymeric dispersant in step b) is carried out with introduction of kinetic energy, for example by mixing or milling. Virtually all devices known to a person skilled in the art are suitable for this purpose.

For the purposes of the present invention, mixing is blending or homogenization which intensifies contact of the components to be mixed and thus allows uniform and/or rapid formation of the desired product.

Methods which effect mixing are, for example, stirring, shaking, injection of gases or liquids and irradiation with ultrasound. Suitable methods and apparatuses which bring about mixing are known to a person skilled in the art. Suitable mixing apparatuses are, for example, stirred vessels, dynamic and static mixers, single-shaft stirring apparatuses, for example stirring apparatuses with scraping devices, in particular paste stirring apparatuses, multishaft stirring apparatuses, in particular PDSM mixers, solids mixers and mixing/kneading reactors.

In a preferred embodiment, contacting takes place with introduction of shearing energy, with more than 50 kWh, in particular more than 200 kWh, preferably more than 400 kWh, especially from 100 to 5000 kWh, in particular from 200 to 3000 kWh, particularly preferably from 300 to 1000 kWh, of shearing energy being introduced per metric ton of the composition.

The shearing energy is defined as the effective work WW which can be calculated from the shearing power PW applied for milling and the milling time t according to the following equation (1):

$$W_W = P_W \cdot t \qquad \text{Equation (1)}$$

The shearing power which acts on the suspension can be calculated from the difference between effective power $P_P$ (power uptake of the apparatus during milling of the suspension) and the null power $P_0$ (power uptake of the apparatus running empty without suspension and if applicable without milling media, e.g. in the case of a bead mill, ball mill or toothed colloid mill) by means of the following equation (2):

$$P_W = P_P - P_0 \qquad \text{Equation (2)}$$

The null power (equation (3a)) or the effective power (equation (3b)) can be calculated from the effective voltage U and the effective current I, which is measured by means of a current measuring instrument on the apparatus in operation:

$$P_0 = U_0 \cdot I_0 \cdot \cos \varphi; \cos \varphi = 1 \qquad \text{Equation (3a)}$$

$$P_P = U_P \cdot I_P \cdot \cos \varphi; \cos \varphi = 1 \qquad \text{Equation (3b)}$$

The ratio of effective power $P_P$ to apparent power $P_S$ of the apparatus is described by $\cos \varphi$ according to equation (4):

$$\cos \varphi = P_P / P_S \qquad \text{Equation (4)}$$

Since the apparent power is very apparatus-specific and the effective power can be measured easily (by measuring the effective voltage and the effective current), $\cos \varphi = 1$ is assumed in the interests of simplicity.

Preference is therefore given to processes which introduce a high shearing energy. The process of the invention is therefore particularly preferably carried out for at least part of the time using an apparatus from the group consisting of mills, ultrasonic apparatuses, rotor-stator mixers (e.g. IKA Ultra-Turrax) and high-speed mixers. In particular, the introduction of shearing energy can be carried out by milling, for example in a toothed colloid mill, bead mill, ball mill or preferably stirred ball mill. The stirred ball mill comprises a milling chamber in which the milling media are present, a stator and a rotor which are arranged in the milling chamber. Furthermore, the stirred ball mill preferably comprises an inlet opening for material being milled and an outlet opening for material being milled to effect introduction and discharge of material being milled into or from the milling chamber, and also a milling media separation device which is arranged upstream of the outlet opening in the milling chamber and serves to separate milling media carried with the material being milled from the material being milled before the latter is discharged from the milling space through the outlet opening.

In order to increase the mechanical milling power introduced into the material being milled in the milling chamber, pins which project into the milling space are preferably present on the rotor and/or on the stator. During operation, a contribution to the milling power is thus firstly produced directly by impacts between the material being milled and the pins. Secondly, a further contribution to the milling power is produced indirectly by impacts between the pins and the milling media entrained in the material to be milled and the subsequent impacts between the material being milled and the milling media. Finally, shear forces and tensile forces acting on the material being milled also contribute to comminution of the suspended particles of the material being milled.

In one embodiment, the contacting with the polymeric dispersant is carried out in two stages. In the first stage, contacting is carried out until the particle size d(99) of the process product from step a) is ≤300 μm and in particular is in the range from 0.5 to 300 μm. This can be carried out using an apparatus selected from among a milling apparatus, an ultrasonic apparatus, a rotor-stator mixing system and a high-speed mixer disk.

In the second stage, step b) is carried out until the process product from step a) has a d(50) particle size of ≤800 nm, preferably ≤400 nm, particularly preferably ≤300 nm, determined by means of static light scattering according to ISO 13320:2020 (analyzed after Mie theory, refractive index=1.59). This is, in particular, carried out using a milling apparatus.

It has been found to be advantageous for a rest time of the suspension of from 0.01 hour to 48 hours, preferably from 4 hours to 24 hours, particularly preferably from 6 hours to 16 hours, to be observed before the introduction of kinetic energy, during which time the suspension rests or is stirred in order to prevent sedimentation in a stirred vessel without action of high shearing energy, i.e. shearing energies of <50 kWh per metric ton of suspension. When the contacting with the polymeric dispersant is carried out in two stages, the rest time can be implement before the first stage or between the two stages.

Before, during or after contacting of the process product from step a) with the dispersant, an acidic compound having preferably a molecular weight from 40 to 99 g/mol, can be added. The addition of acidic compound is preferably carried out after contacting of the process product from step a) with the dispersant has occcured. The acidic compound is, for example, selected from among nitric acid, sulfamic acid, methanesulfonic acid, formic acid, acetic acid, sulfuric acid and mixtures thereof, preferably sulfamic acid, methanesulfonic acid, acetic acid and mixtures thereof. The amount of the acidic compound is appropriately selected so that a pH of the suspension of 11.0-13.0, preferably 11.4-12.5, particularly preferably 11.8-12.4, is obtained immediately after the addition of acid (10 to 60 seconds) or after complete homogenization.

The invention further provides a calcium silicate hydrate composition comprising 60-85% by weight of calcium silicate hydrate, 10-20% by weight of water-soluble polymeric dispersant, 0.4-3.6% by weight of the organic compound, based on the dry weight of the composition, wherein the organic compound has a molecular weight of 100 to 600 g/mol and from 0.015 to 0.035 functional groups per gram of the organic compound, wherein the functional groups being selected from —OH, —COOH, —COOM$_a$, —SO$_3$H, —SO$_3$M$_a$ or —C(═O)H, wherein M is hydrogen, a mono-, di- or trivalent metal cation, ammonium ion or an organic amine radical and a is ⅓, ½ or 1.

In one embodiment, the calcium silicate hydrate containing composition according to the present invention comprises 0.5 to 3.0 wt.-%, preferably 0.5 to 2.0 wt.-%, and more preferably 0.6 to 1.2 wt.-% of the organic compound by dry weight of the composition.

In one embodiment, the weight ratio of calcium silicate hydrate to the water-soluble polymeric dispersant in the composition according to the present invention is 8:1 to 3:1, preferably 6:1 to 3:1 and more preferably 5.5:1 to 4:1.

The invention further provides for the use of the calcium silicate hydrate compositions according to the invention as curing accelerator for hydraulic or latent hydraulic binders, in particular cement, slag, preferably granulated blast furnace slag, flyash, silica flour, metakaolin, natural pozzolanas, calcined oil shale, calcium sulfoaluminate cements and/or calcium aluminate cements, preferably of building material mixture comprising predominantly cement as hydraulic binder.

The building material mixture can also comprise further additives which are typically used in the field of building chemicals, for example other curing accelerators, dispersants, plasticizers, water reducers, setting retarders, antifoams, air pore formers, retarders, shrinkage-reducing agents, redispersible powders, freezing protection agents and/or antieffiorescence agents.

Suitable other curing accelerators are alkanolamines, preferably triisopropanolamine and/or tetrahydroxyethylethylenediamine (THEED). The alkanolamines are preferably used in an added amount of from 0.01 to 2.5% by weight, based on the weight of the hydraulic binder. When amines, in particular triisopropanolamine and tetrahydroxyethylethylenediamine, are used, synergistic effects can be found in respect of the early strength development of hydraulic binder systems, in particular cement-like systems.

Further suitable other curing accelerators are, for example, calcium chloride, calcium formate, calcium nitrate, calcium sulfamate, calcium acetate, inorganic carbonates (e.g. sodium carbonate, potassium carbonate), 1,3-dioxolan-2-one and 4-methyl-1,3-dioxolan-2-one. Preference is given to using calcium formate and calcium nitrate in an amount of from 0.1 to 4% by mass based on the hydraulic binder.

Suitable dispersants, plasticizers, water reducers are, for example:
a) sulfonated melamine-formaldehyde condensates, b) lignosulfonates, c) sulfonated ketone-formaldehyde condensates, d) sulfonated naphthalene-formaldehyde condensates (BNS), e) polycarboxylate ethers (PCE), f) nonionic copolymers for lengthening the processability of a cement-based mixture comprising cement and water, where the copolymer comprises units derived from at least one of the following monomer components: component A, namely an ethylenically unsaturated carboxylic ester monomer having a unit which can be hydrolyzed in the cement-based mixture; and component B, namely an ethylenically unsaturated carboxylic ester monomer or alkenyl ether monomer comprising at least one poly-C$_{2-4}$-oxyalkylene side chain having from 1 to 350 oxyalkylene units, or g) dispersants which comprise phosphonate groups and have the formula R—(OA)$_n$-N—[CH$_2$—PO(OM$_2$)$_2$]$_2$, where R is H or a saturated or unsaturated hydrocarbon radical, preferably a C$_1$-C$_{15}$-alkyl radical;

the radicals A can be identical or different and are alkylenes having from 2 to 18 carbon atoms, preferably ethylene and/or propylene, in particular ethylene;

n is from 5 to 500, preferably from 10 to 200, in particular from 10 to 100, and M is H, an alkali metal, ½ alkaline earth metal and/or an amine, with every combination of the abovementioned dispersants a) to g) being encompassed.

Suitable setting retarders are citric acid, tartaric acid, gluconic acid, phosphonic acid, aminotrimethylenephosphonic acid, ethylenediaminotetra(methylenephosphonic) acid, diethylenetriaminopenta(methylenephosphonic) acid, in each case including the respective salts of the acids, pyrophosphates, pentaborates, metaborates and/or sugars (e.g. glucose, molasses). The advantage of the addition of setting retarders is that the open time can be controlled and in particular may be able to be extended. The setting retarders are preferably used in an amount of from 0.01% by weight to 0.5% by weight, based on the weight of the hydraulic binder, preferably cement.

The composition comprising calcium silicate hydrate according to the invention displays, in particular, a surprisingly strong accelerating effect on the curing of hydraulic binders or latent hydraulic binders, in particular portland cement. The use of the composition comprising calcium silicate hydrate makes it possible to improve the early strength of the hydraulically or latently hydraulically setting binders, in particular portland cement. Furthermore, the composition has improved use properties, e.g. a low viscosity, even after a prolonged storage time, in the concentration ranges relevant to the use. It is therefore easy to handle and allows easy pumping and spraying.

The invention will be illustrated by the the following examples.

EXAMPLES

Dextrose (CAS-number: 50-99-7) (Sigma Aldrich). Dextrose with the chemical formula $C_6H_{12}O_6$, has a molecular weight of 180,16 g/mol and 0.033 functional groups per gram of the organic compound according to the invention.

Na-gluconate (CAS-number: 527-07-1) (Sigma Aldrich). Na-gluconate with the chemical formula $C_6H_{11}NaO_7$, has a molecular weight of 218,137 g/mol and 0.0275 functional groups per gram of the organic compound according to the invention.

Na-tartrate (CAS-number: 51307-92-7, racemic mixture) (Sigma Aldrich). Na-tartrate with the chemical formula $C_4H_4Na_2O_6$, has a molecular weight of 194,08 g/mol and 0.0206 functional groups per gram of the organic compound according to the invention.

Na-citrate (CAS-number: 18996-35-5) (Sigma Aldrich). Na-citrate with the chemical formula $C_6H_5Na_3O_7$, has a molecular weight of 258,07 g/mol and 0.0155 functional groups per gram of the organic compound according to the invention.

Hydrothermal C—S—H (ht-C—S—H) has been prepared according to WO 2018/154012, page 33, line 6-14 and exhibited a moisture content of 42 wt.-% and a particle size $d_{90}$<1 mm after crushing (determined via Laser granulometrie according to ISO 13320:2020).

A precharge of 1000 kg was prepared containing 566 kg of h-C—S—H (58 wt.-% solids content), 158 kg of the dispersing agent P3 described in WO 2018/154012, page 32, line 4-8 (45 wt.-% solids content), 1.4 kg of defoamer (Semifinish 2, BASF, 57% solids content) and 275 kg of water yielding a slurry with a solids content of 40 wt.-%.

The slurry in the precharge was continuously stirred at a moderate rate with a dissolver and then fed into a milling aggregate (MacroMedia, fabricated by Buhler group) in a circular fashion to carry out a first pregrinding step. The milling chamber exhibited a volume of 6 L and was equipped with a rotor-stator element with attached steel bars of a size of 300 mm and Y-stabilized $ZrO_2$ balls of a size of 3 mm. The pregrinding was performed for 75 minutes with a throughput rate of 18.7 m³/h and agitator velocity of 10.2 m/s yielding an energy input of 21 kWh/t suspension. The pregrinding was terminated when a $d_{50}$ of 8.8 μm and a $d_{90}$ of 14.6 μm was reached—determined via Laser diffraction (Horiba LA 950 V2 instrument fabricated by RESCH).

The so obtained preground suspension was then diluted to a solids content of 28 wt.-% and 2 kg of the material was finegrinded with a laboratory scaled agitated ball mill.

The utilized agitated ball mill (Labstar, fabricated by Netzsch) was characterized by a volume of 0.7 L. The grinding chamber consisted of a rotor shaft and discs made of polyurethane and a slit size of 0.4 mm. Grinding beads of Y-stabilized $ZrO_2$ with a size of 0.5 mm were used up to a degree of filling of ~80 vol.-%.

The suspension was ground batch-wise with two passes in total. The mill was operated at a power of 1.0 kW with the agitator having a rotational speed of 9 m/s.

The final suspension showed a fine particle size distribution with a $d_{50}$ of 190 nm. Furthermore, the suspension displayed a viscosity of ~100 mPas (23° C., Brookfield spindle 64, 12 rpm) directly after grinding and was thus perfectly suited for pratical use (pumping, spraying). Additionally, the acceleration potential was determined with heat-flow calorimetry. The experimental protocol is described in WO 2018/154012, page 36, line 37 to page 37, line 7. All samples were dosed at 6 wt.-% of suspension based on cement weight.

The acceleration potential was then quantified by calculating the total heat released during 0.5 and 6 hours of the cement reaction as a measure for the progression of the silicate reaction.

The suspension was then devided into several samples containing either no further additives (Comparative examples 1 and 2) or with 3.0 and 5.4 wt.-% addition of low molecular weight additives with a high degree of functionalization (based on weight of solid ht-C—S—H) (Inventive examples 3 to 16).

The suspensions were then stored unagitatedly in a sealed glass vial on the laboratory bench at room temperature or at 40° C. and the rheological and acceleration properties were monitored over time.

It was observed that the reference suspension without further additive stored at room temperature was prone to a progressive viscosity build-up over time which eventually led to a gel formation after a couple of months (Comp. 1 and Comp. 2 in Table 1), denoted by a viscosity>50,000 mPas in the given measurement setup. The same behavior was accelerated by a higher storage temperature.

Surprisingly, it was found that samples containing the low molecular weight additives with a high degree of functionality were able to strongly retard the viscosity build-up while still maintaining a high acceleration power of the C—S—H suspension. The acceleration factor displayed Table 1 is calculated as the heat of hydration in the presence of the additive containing suspension normalized to the mix with the reference suspension at the given storage temperature. The value thus serves as a quantitative measure for the retarding influence of the viscosity controlling additives.

Especially the dosage of sodium tartrate and glucose only had a very minor effect on the acceleration potential of the suspension while clearly preventing the gel formation over more than 35 weeks at room temperature.

TABLE 1

Summery of the viscosity and acceleration performance of the comparative and inventive suspensions (Comp. = Comparative Example; Inv. = Example according to the invention)

| Experiment number | Sample description | Storage temperature [° C.] | Viscosity of susp. @ 23° C. [mPas] 4 weeks | 10 weeks | 35 weeks | HoH [J/g] | Rel. AF |
|---|---|---|---|---|---|---|---|
| Comp. 1 | Ground ht-CSH (28%) | 23 | 100 | 20000 | >50000 | 107.5 | 1.00 |
| Comp. 2 | Ground ht-CSH (28%) | 40 | 1700 | >50000 | >50000 | 112.9 | 1.00 |
| Inv. 1 | 6.1% Ground ht-CSH (28%) + 3 wt-% Dextrose | 23 | 100 | 100 | 100 | 104.8 | 0.98 |
| Inv. 2 | 6.1% Ground ht-CSH (28%) + 3 wt-% Na-gluconate | 23 | 100 | 100 | 100 | 99.9 | 0.93 |
| Inv. 3 | 6.1% Ground ht-CSH (28%) + 3 wt-% Na-tartrate | 23 | 100 | 100 | 100 | 103.0 | 0.96 |
| Inv. 4 | 6.1% Ground ht-CSH (28%) + 3 wt-% Na-citrate | 23 | 100 | 100 | 320 | 103.3 | 0.96 |
| Inv. 5 | 6.1% Ground ht-CSH (28%) + 3 wt-% Dextrose | 40 | 100 | 1000 | >50000 | 110.2 | 0.98 |
| Inv. 6 | 6.1% Ground ht-CSH (28%) + 3 wt-% Na-gluconate | 40 | 100 | 7200 | >50000 | 100.8 | 0.89 |
| Inv. 7 | 6.1% Ground ht-CSH (28%) + 3 wt-% Na-tartrate | 40 | 100 | 400 | >50000 | 105.1 | 0.93 |
| Inv. 8 | 6.1% Ground ht-CSH (28%) + 3 wt-% Na-citrate | 40 | 100 | 2500 | >50000 | 105.7 | 0.94 |
| Inv. 9 | 6.2% Ground ht-CSH (28%) + 5.4 wt-% Dextrose | 23 | 100 | 100 | 100 | 103.5 | 0.96 |
| Inv. 10 | 6.2% Ground ht-CSH (28%) + 5.4 wt-% Na-gluconate | 23 | 100 | 100 | 100 | 89.5 | 0.83 |
| Inv. 11 | 6.2% Ground ht-CSH (28%) + 5.4 wt-% Na-tartrate | 23 | 100 | 100 | 100 | 100.6 | 0.94 |
| Inv. 12 | 6.2% Ground ht-CSH (28%) + 5.4 wt-% Na-citrate | 23 | 100 | 100 | 210 | 97.7 | 0.91 |
| Inv. 13 | 6.2% Ground ht-CSH (28%) + 5.4 wt-% Dextrose | 40 | 200 | 1800 | >50000 | 118.3 | 1.05 |
| Inv. 14 | 6.2% Ground ht-CSH (28%) + 5.4 wt-% Na-gluconate | 40 | 2300 | 7400 | >50000 | 93.1 | 0.82 |
| Inv. 15 | 6.2% Ground ht-CSH (28%) + 5.4 wt-% Na-tartrate | 40 | 100 | 2300 | >50000 | 105.6 | 0.94 |
| Inv. 16 | 6.2% Ground ht-CSH (28%) + 5.4 wt-% Na-citrate | 40 | 100 | 1100 | >50000 | 103.0 | 0.91 |

The invention claimed is:

1. A process for producing a composition comprising calcium silicate hydrate, the process comprising the steps of
   a) reacting a calcium hydroxide source with a silicon dioxide source in the presence of water under hydrothermal conditions at a temperature in the range of from 100° C. to 400° C. for a period of from 1 hours to 30 hours, forming a process product from step a);
   b) bringing in contact
      i) the process product from step a) and
      ii) a water-soluble polymeric dispersant
      in an aqueous medium while introducing kinetic energy, forming a process product of step b;
   and optionally,
   c) adding the process product of step b) to a building material mixture comprising a hydraulic binder or a latent hydraulic binder;
   wherein an organic compound is added in at least one of the steps a), b) or to the process product after completion of step b),
   wherein the organic compound has a molecular weight of 100 to 600 g/mol and from 0.015 to 0.035 functional groups per gram of the organic compound, wherein the functional groups being selected from —OH, —COOH, —COOM$_a$, —SO$_3$H, —SO$_3$M$_a$, or —C(=O)H, wherein M is hydrogen, a mono-, di- or trivalent metal cation, ammonium ion or an organic amine radical and a is ⅓, ½ or 1,
   wherein when the organic compound is added in step a), the temperature in step a) is chosen below the melting point of the organic compound used and
   wherein when the organic compound is added to the process product after completion of step b), and if the process comprises a step c), the organic compound is added between steps b) and c).

2. A process according to claim 1, wherein the organic compound is selected from the group consisting of dextrose, galactose, tartaric acid, sodium tartrate, gluconic acid, sodium gluconate, citric acid and sodium citrate.

3. A process according to claim 1, wherein the organic compound is added in an amount of 0.5 to 6% by weight based on the amount of the calcium silicate hydrate, calculated as dry component.

4. A process according to claim 1, wherein the organic compound is added to the process product after completion of step b).

5. A process according to claim 1, wherein a molar ratio of calcium to silicon in step a) is in a range of from 0.5 to 2.5.

6. A process according to claim 1, wherein the kinetic energy in step b) is effected by introduction of mixing or shearing energy.

7. A process according to claim 6, wherein the kinetic energy in step b) is effected by milling.

8. A process according to claim 1, wherein step b) is carried out until the process product from step a) has a d(50) particle size of ≤800 nm, determined by static light scattering according to ISO 13320:2020.

9. A process according to claim 1, wherein the reaction in step a) is made in the presence of a foaming agent.

10. A process according to claim 1, wherein the water-soluble polymeric dispersant is a comb polymer having polyether side chains.

11. A process according to claim 1, wherein the water-soluble polymeric dispersant is a polycondensation product having polyalkylene oxide side chains.

12. A calcium silicate hydrate composition comprising
    60-85% by weight of calcium silicate hydrate
    10-20% by weight of water-soluble polymeric dispersant
    0.4-3.6% by weight of the organic compound
    based on the dry weight of the composition, wherein the organic compound has a molecular weight of 100 to 600 g/mol and from 0.015 to 0.035 functional groups per gram of the organic compound, wherein the functional groups being selected from —OH, —COOH, —COOM$_a$, —SO$_3$H, —SO$_3$M$_a$ or —C(=O) H, wherein M is hydrogen, a mono-, di- or trivalent metal cation, ammonium ion or an organic amine radical and a is ⅓, ½ or 1.

13. A method comprising utilizing the calcium silicate hydrate according to claim 12 as curing accelerator for hydraulic or latent hydraulic binder.

* * * * *